United States Patent
Flemmens et al.

(10) Patent No.: US 12,203,057 B2
(45) Date of Patent: Jan. 21, 2025

(54) METHOD FOR PREPARING HOP OIL EMULSIONS

(71) Applicant: Sorse Technology Corporation, Seattle, WA (US)

(72) Inventors: Michael S. Flemmens, Chicago, IL (US); Jerry Bryan, Seattle, WA (US); Zach Hershberger, Seattle, WA (US); Daniel Sondheim, Seattle, WA (US); Donna K. Wamsley, Tacoma, WA (US)

(73) Assignee: Sorse Technology Corporation, Seattle, WA (US)

( * ) Notice: Subject to any disclaimer, the term of this patent is extended or adjusted under 35 U.S.C. 154(b) by 289 days.

(21) Appl. No.: 17/307,660

(22) Filed: May 4, 2021

(65) Prior Publication Data

US 2021/0340472 A1 Nov. 4, 2021

Related U.S. Application Data

(60) Provisional application No. 63/019,959, filed on May 4, 2020.

(51) Int. Cl.
*C12C 3/08* (2006.01)
*C12C 3/00* (2006.01)
*C12C 5/02* (2006.01)

(52) U.S. Cl.
CPC .............. *C12C 3/08* (2013.01); *C12C 5/026* (2013.01); *C12C 9/025* (2013.01)

(58) Field of Classification Search
CPC ............ C12C 9/025; C12C 3/08; C12C 5/026
See application file for complete search history.

(56) References Cited

U.S. PATENT DOCUMENTS

| 3,044,879 A * | 7/1962 | Kissel ................ C12C 3/00 568/376 |
| 3,615,660 A | 10/1971 | Bavisotto et al. |
| 2010/0098821 A1 | 4/2010 | Comstock et al. |
| 2018/0360704 A1 | 12/2018 | Riefler et al. |
| 2020/0048590 A1 | 2/2020 | Wolinska |

OTHER PUBLICATIONS

Micketts et al Detection of Terpene Compounds from Hops in American Lager Beer Journal o/Food Protection vol. 4/, No. 9, Pagt>s 722•725 (Sep. 1978) Copyright © 1978, International Association of Milk, Food, and Environmental Sanitarians (Year: 1978).*
https://www.yakimachief.com/media/wysiwyg/Cryo-Hops-Product-Data-Sheet.pdf Cryo Hops® Production Data Sheet revised Mar. 2019 (Year: 2019).*

* cited by examiner

*Primary Examiner* — Vera Stulii
(74) *Attorney, Agent, or Firm* — Krista A. Wittman

(57) ABSTRACT

A method for preparing hop extract emulsions is provided. One to two parts hop extract is combined with eight to nine parts diluent oil as an oil mixture. The oil mixture is heated until reaching a viscosity threshold when the heated oil mixture is combined with an emulsifying solution. The emulsifying solution includes an emulsifying agent dispersed in water. Upon combining the oil mixture and emulsifying solution, the emulsifying agent enrobes droplets of the hop extract. The combined oil mixture and emulsifying solution is mixed and homogenized.

10 Claims, 2 Drawing Sheets

METHOD FOR PREPARING HOP OIL EMULSIONS

CROSS-REFERENCE TO RELATED APPLICATION

This non-provisional patent application claims priority under 35 U.S.C. § 119(e) to U.S. Provisional Patent application Ser. No. 63/019,959, filed May 4, 2020, the disclosure of which is incorporated by reference.

FIELD

This application relates in general to emulsions, and in particular to a method for preparing hop oil emulsion.

BACKGROUND

Hops are a traditional element for many styles of beer and other beverages. Traditionally, dried hops are added during the production process for beer in various forms, including flower, pellets, as well as other forms. Hops are added as a flavor modifier to impart unique flavor and aroma sensory attributes to the beer products. The predominance of the sensory modification is achieved through diffusion of chemical compounds found naturally occurring in the hops into the water phase of the product.

Traditionally, beer is made by first soaking barley and allowing germination of the barley during which the enzyme amylase is formed, during a malting stage. The resulting product of the malting stage is a green malt. During a milling stage, the green malt is milled to produce crushed malt. The malt is then mixed with water and mashed. During the mashing, starch dissolves, while sugar, protein, and tannins are released to form a malt extract. The mash, or malt extract, is filtered to separate wort from any remaining grain during a lautering stage. The solid wort is then rotated to form a cone, while clear wort taps off to the side during a wort clarification stage. During a fermentation stage, the clear wort is cooled and yeast is added. During fermentation, malt sugar in the cooled wort is turned into alcohol and carbon dioxide to create beer. The beer is then stored, during which a secondary fermentation takes place and the remaining yeast particles and protein tannin sink to the bottom. As a result of the second fermentation, the beer takes on a clear color. Finally, the beer is filtered to remove the yeast, hop resin, and protein.

The hops are an important part of beer and other beverage making, but using actual hops, in a fresh, dry, or pellet form, does potentially lead to undesirable and unintended consequences, such as diacetyl formation, also known as dry hop creep. Dry hop creep is a phenomenon where over-attenuation and over-carbonation of beer that has been dry-hopped can occur after packaging. Hops themselves contain fermentable sugars that are consumed by yeast, such as in beer. The hops also have "wild" yeast attached to them that re-ferment the beer and a diastase, which means that they have an enzyme which breaks down non-fermentable sugars into fermentable sugars.

The enzymes in hops are a-amylase and b-amylase (the same enzymes found in malt that do the heavy lifting during mashing), limit dextrinase and amyloglucosidase. But limit-dextrinase and amyloglucosidase are the most interesting since they break down non-fermentables into fermentable sugars for the yeast to act upon and cause dry hop creep.

The enzymes in dry hops act upon the starches and dextrins in the beer, breaking them down into fermentable sugars. The yeast that is left in the beer referments those sugars, as a secondary fermentation. While additional alcohol and CO2 are produced, a natural by-product of fermentation, called a-acetolactate, is produced by the yeast and goes through a normal oxidative decarboxylase reaction to form diacetyl. Because packaged beer is commonly refrigerated, the yeast cannot adequately clean up the diacetyl, as per normal, during a diacetyl rest, thereby leaving it in the beer after its formation.

Clean beer is usually in the 4.0-4.5 pH range, which is an ideal condition for hop enzymes. Enzyme activity is able to break down dextrins into fermentable sugars even while the beverage or beer is refrigerated. This enzyme activity is independent of yeast activity and, at the same time, the yeast left in a beer can't begin to re-ferment at cold temperatures. But, if the beer were to come back up into a temperature range, such as when a bottle or can sits on a warm shelf or in a keg that is shipped in the back of a warm truck where the yeast can become active again, fermentation will begin.

Some American ale strains start to become active at as low as 9 C/48 F. When fermentation begins, a-acetolactate is produced and will likely go through oxidative decarboxylation to form diacetyl. However, if the beer never goes up in sufficient temperature to undergo a second "diacetyl rest," then the diacetyl remains present in the beer.

Traditional methodologies for dealing with dry hop creep involve additional processing steps which adds unneeded complexity and cost, reduces yields, and creates additional labor demands. Examples of the additional processing steps can include removing all yeast, pasteurization, and coarse filtration, as well as other examples.

In addition to causing dry hop creep, traditional hops drive yield loss. In most cases, the hops used are a dried product, whether in the form of flowers or pressed pellets. When the dried hops are introduced into a batch of beer, the dried matter absorbs the beer when it rehydrates. Even with filter presses, there still is some residual beer absorbed that cannot recovered. Adding to the loss, some breweries choose to dry hop multiple times to boost the flavor, and at every time more beer is lost to absorption. While losses can be in the single digits for a lightly hopped style (3-5%) very large losses can occur with multiple hop additions at high hop loads. These losses can be as high as (15-30%), Hop oil, extracted from a hop plant, is by definition an oil and is insoluble in an aqueous environment. Typical practices for using hop oil is to add the hop oil to a 190-proof ethanol or by using propylene glycol as a co-solvent. The 190-proof ethanol, commonly sold under the brand Everclear, is not available in every market and in some jurisdictions is a controlled or banned substance. Additionally, many states/countries/jurisdictions do not allow for the inclusion of distilled spirits into beer. Propylene glycol is not favored due to its negative sensory profile and is not conducive to a 'clean' label declaration.

Therefore, there is a need for an approach to convert hop oil into a form that reduces product yield loss and does not use alcohol. Preferably, the conversion process includes an emulsification of the hop oil for mixing with beer or other liquid, without requiring the beverage maker to obtain special equipment.

SUMMARY

Hops are commonly added to many beverage products, including beer, tea and soda, to add flavor and aroma. However, the use of hops can result in adverse chemical reactions, also known as dry hop creep, as well as absorb a portion of the beverage. Use of a hop emulsion can mitigate dry hop creep, reduce absorption by the hops, and prevent the use of alcohol, which is commonly mixed with hops.

An emulsification of hop oil in water can be performed to evenly distribute oil droplets of the hop oil throughout the water for use in beer or other goods. During the emulsification, an emulsifier enrobes the oil droplets for use in beer without losing any of the beer product to absorption by traditional hops.

An embodiment provides a method for preparing hop extract emulsions. One to two parts hop extract is combined with 8-9 parts diluent oil as an oil mixture. The oil mixture is heated until reaching a viscosity threshold and the heated oil mixture is combined with an emulsifying solution. The emulsifying solution includes an emulsifying agent dispersed in water. Upon combining the oil mixture and emulsifying solution, the emulsifying agent enrobes droplets of the hop extract. The combined oil mixture and emulsifying solution is mixed and homogenized.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
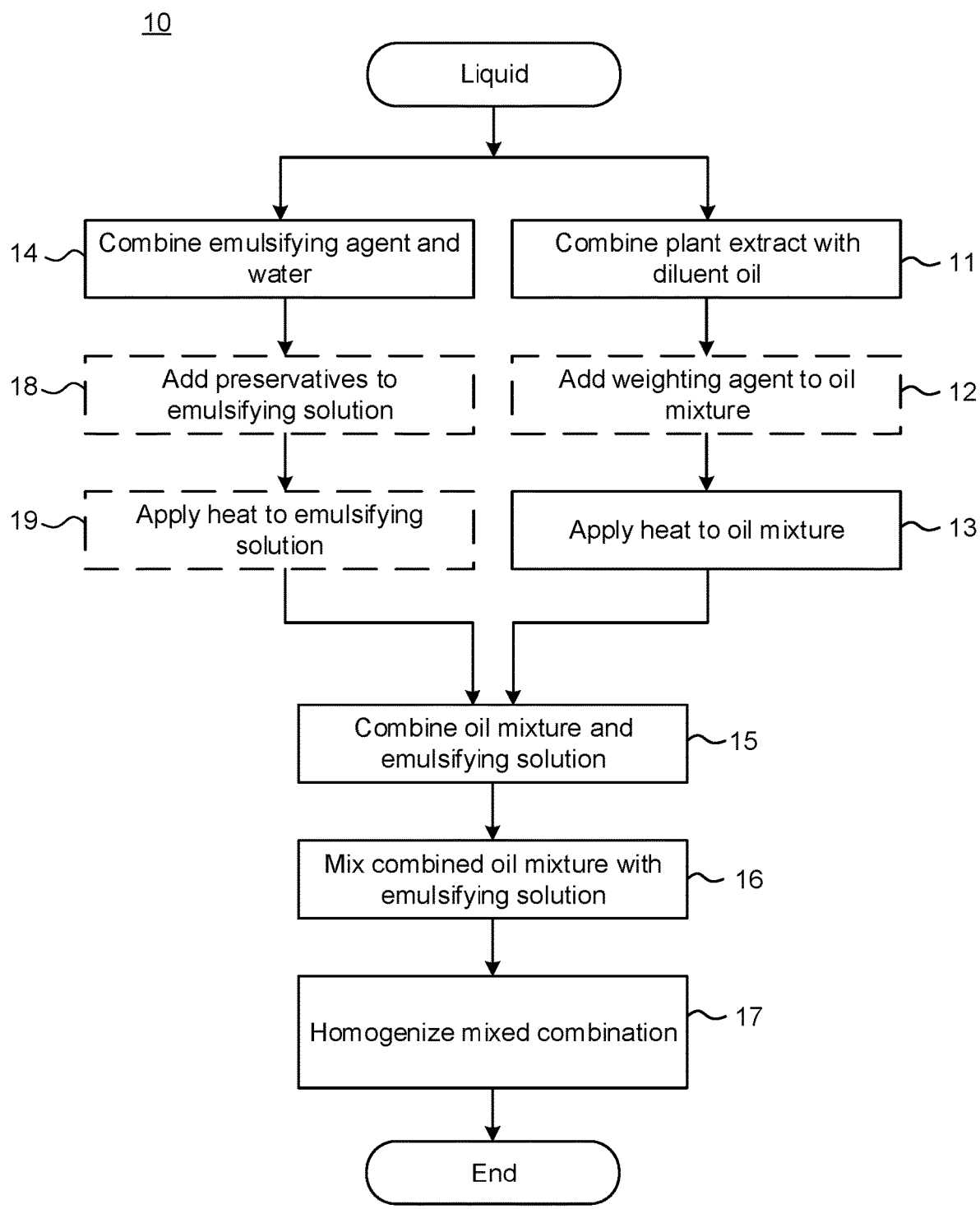
FIG. 1 is a flow diagram showing a method for preparing stable liquid emulsion forms of plant extract, in accordance with one embodiment.

The use of hops in beverages is common to provide flavor. However, the addition of hop extract is often mixed with alcohol, such as Everclear or propylene glycol, to solubilize the hop extract. Dry hops can also cause dry hop creep, which is a refermentation process that can result in an increase in alcohol, an increase in diacetyl causing an "off" flavor, and over pressurization, sometimes causing bottles or other beverage packaging to explode. Use of a hop emulsion can prevent refermentation and not require additional equipment, making implementation easy and less expensive. Use of the hop emulsion can also mitigate any yield loss issues that are present in conventional beer making methods.

The hop emulsion can also be used to make a hazy beer. There is currently a big trend in the beer industry to create a 'hazy' or unclear style of beer that has an 'un-filtered' look. Conventional techniques for creating haze require special ingredients, process steps or equipment, and all can impact the overall flavor of the finished product, as well increased time and cost for producing the haze. Rather than adjusting the mash ingredients or increasing the use of expensive hops, the hazy appearance and to some degree the amount of haze can be controlled through the use of the hop emulsion. Specifically, controlling the particle size of the emulsified droplets can be used to create a haze. For instance, the size of the droplet directly correlates to the amount of light that is attenuated, reflected, or transmitted through a product containing the emulsion. As the emulsified droplets get smaller and smaller, light is less and less refracted and/or reflected. Conversely as the droplets increase in size they refract and/reflect much more light and cause a hazy or cloudy appearance. Both the amount of light transmitted through the product, as well as the amount of light reflected by the beverage, are tunable simply by adjusting particle size of the emulsion. Specifically, the droplets can have a size of around 2-45μ to create a hazy appearance.

The hop oil emulsion can be manufactured using natural, food grade materials and water. All compounds can be or are approved for use in food and beverages and are generally recognized as safe (GRAS) as listed by the U.S. Food and Drug Administration.

Traditionally, hop oil itself is added to a barrel of beer in a small amount Based on the small amounts of hop oil, for example, sometimes as low as 2-5 ml of hop oil per barrel of beer (BBL), accurate dosing can be challenging. The margin for error is small and small variances can have large sensory impacts. These variations will manifest themselves as batch to batch variation and are likely to cause confusion in the consumer. For example, if the target is a 3.5 ml dose and the operator mistakenly adds only 3 ml of the hop oil itself, there is a <15% difference. The 0.5 ml difference is a fairly small amount, but could have noticeable affects when the difference is around 15%.

However, a loading level of the hop emulsion can help minimize variance. For example, instead of adding 4 ml of a viscous, sticky hop oil to a beverage, 40 ml of water compatible emulsion, including 4 ml of hop oil, can be added. For a target of 40 ml with a total amount of 39.5 ml, the total deviation of 0.5 ml has only a 1.25% difference, unlike the example above.

If adding the thick and viscous oil alone there is a high chance the oil will coalesce often on the sides of the tank or by blocking a valve. The oil/resin has a lower density than the brew/water and will be likely result in hot pockets of oil and/or oil slicks and ringing. The hop oil emulsion is to be weighted with a weighting agent to match the density/specific gravity of the beer/or beverage. Brewed beer has a specific gravity or density from 0.95-1.2 g/ml, whereas hop oil has a density of <9. Thus, when added directly to water, beer or other beverage, the hop oil will remain coalesced and cream. The hop oil emulsion is weighted with a weighting agent to match the density of the specific gravity of beer, water, or other beverage to which the emulsion is added. The density is adjusted by adding more or less of the weighting agent, such as SAIB.

Breweries currently using hop oil have created additional processing steps and need, in most cases, additional processing equipment to infuse the hop oil into their production process. Extra steps and equipment are required when standalone hop oil is used to improve hop additions. Examples of additional steps can include diluting hop oil with high proof ethanol and mixing for up to 12 hours on a stir plate, as well as a hop gun procedure during which a hop gun is filled and circulated for 1 hour at a particular flow rate. Additional equipment can include hop injection equipment, such as a hop whirlpool addition, hop back, or hop infusers.

Using a hop oil emulsion allows for seamless integration. One simply measures out the required volume and then dumps the emulsion directly into the tank or barrel of beer, or other beverage. No special processing or special equipment is required, which can drive customer adoption.

Hop oil can be converted to a liquid emulsion using non-solvent based compounds for use in beverages, food, and tinctures, as well as other products. FIG. 1 is a flow diagram showing a method for preparing stable liquid emulsion forms of plant extract, in accordance with one embodiment. Plant extract to be converted to a different form can be obtained in an oil form and combined with a diluent oil (block 11) and optionally, an oil based weighting agent (block 12), as an oil mixture. In one embodiment, 1-2 parts hop extract, such as measured by volume, can be combined with 8-9 parts volume of diluent oil as the complete oil mixture having 10 parts total volume. However, other ratios are possible. The plant extract can include one or more components of a plant, such as a hop plant. However, other types of plants are possible.

The plant extract for use in the emulsion can include a single plant component or different plant components. In one embodiment, oil can be extracted from the hop plant when the hops are dry, wet, or spent, which is the residue of hops after brewing. In particular, the hops can be uncleaned or processed. The processed hops can be obtained via thin layer steam distillation, high pressure supercritical $CO_2$ extraction, combining with organic solvents, such as Hexane and Pentane, fractional distillation, combining with polar solvents, such as Ethanol, ultrasound assisted extraction, and microwave assisted extraction. Additionally, the plant extract can include terpenes or hydrocarbons extracted from hops, or lupulin powder, which is also extracted from hops and has many of the hop acids and essential oils that create flavor. Specifically, lupulin powder can be removed from the wort cone during the wort clarification step of beer making. The lupulin powder itself may go through the emulsification process by dissolving in the oil phase and as a result, become enrobed by the emulsifying agent. Alternatively, the lupulin powder can be mixed with hop oil, and later diluent oil for use in the emulsification process, as described below.

The diluent oil should have a lower viscosity than the plant extract and can be selected based on a viscosity of the plant extract. Examples of the diluent oil can include food grade oils, such as vegetable oil, olive oil, canola oil, safflower oil, and rapeseed oil, as well as other types of oils, including mid-chain triglycerides. The diluent oil can include a single type of oil or a blend of different oil types. In one embodiment, the oil mixture can include around 0-90% diluent oil and 10-90% extracted plant oil. In a further embodiment, the diluent oil may not be necessary, such as when the plant extract has an acceptable viscosity of less than around 35,000 cps. For example, when extracting oils from a hop plant, terpenes are also extracted, which have a low viscosity. Thus, if the hop oil and terpenes are emulsified together, diluent oil is not necessary since the terpenes lower the viscosity of the hop oil. In contrast, if the hop oil is separated from the terpenes for emulsification, diluent oil must be added to lower the viscosity of the hop oil.

A weighting agent has a specific gravity of weight greater than 1.0. The weighting agent can include ester gum, dammar gum, brominated vegetable oil, sucrose acetate isobutyrate (SAIB) or other types of weighting agents, and can increase the density of the plant extract and diluent oil to prevent the oil mixture from floating to the top when combined with water in a later step, which is described further below. In one embodiment, the amount of the weighting agent should be selected based on the desired target density of the resulting oil mixture or based on the extracted plant extract oil. Specifically, the weighting agent should increase the density of oils in the plant extract, which are often less than a specific gravity of 1.0. In one embodiment, the density of the plant extract oils should be raised to a similar density of water.

Heat can be applied (block 13) to the oil mixture to enhance mixing of the plant extract and diluent oil, and weighting agent if added. Once the oil mixture reaches a viscosity level of less than around 35,000 cps, the mixture can be combined (block 15) with an emulsifying solution, which can be prepared (block 14) simultaneously with the heating of the oil mixture or at a different time. Other viscosity levels are possible. At a minimum, the oil mixture should have a viscosity low enough to mix with the emulsifying solution. Once mixed, the oil mixture can make up about 10% of the emulsion, in one embodiment, while the water phase makes up about 90%. When the oil mixture makes up about 10% of the emulsion, the hop oil can be present in the amount between 8-9% of the emulsion. Other percentages and ratios of the oil mixture to emulsifying solution are possible, as well as the percentage of hop oil in the emulsion, which can range from 1.5 to 30% or higher.

To prepare (block 14) the emulsifying solution, an emulsifying agent, or emulsifier, is dispersed in water, which acts as a carrier to the plant extract when combined. The emulsifying agent can have low or high hydrophilic-lipophilic balance levels, and can include both water and oil soluble emulsifiers, such as modified food starch, an extract of the *Quillaja saponaria* Molina tree, known as Q-Naturale, lecithin, monoglycerides, gum *Acacia*, diglycerides, sucrose monopalmitate (P90), polysorbate 80 (tween 80), or polysorbate 20 (tween 20), as well as various proteins. Other emulsifying agents are possible.

Concentration of the emulsifying agent is first determined by its nature based on an emulsifying strength and then as a function of the oil mixture to be added. Different emulsifying agents can be used at a different ratio of emulsifier to oil mixture. For example, the emulsifying agents, Gum *Acacia* and modified food starch, can be used at a ratio of 1 part oil mixture to 0.1 to 4.0 parts emulsifying agent. Meanwhile, mono and/or diglycerides, Tween 20 or 80, and Q-Natural could be used at lower levels ranging from 1 part oil mixture to 0.1 to 1.0 emulsifying agent.

In one embodiment, preservatives can be added (block 18) to the emulsifying solution to increase shelf life of the resulting emulsion. Examples of components that can be used as a preservative include, but are not limited to, one or more of potassium sorbate, sodium benzoate, ascorbic acid, gluconic acid, and citric acid. The preservatives can also be added at other steps, such as to the oil mixture or to the combined oil mixture and emulsifying solution.

In one embodiment, the components of the emulsion can be included in the amounts listed in the table below:

| Hop Emulsion | Range | Preferred Range |
| --- | --- | --- |
| Water | 3-90% | 60-80% |
| Sodium Benzoate | 0.001-1% | 0.001-1% |
| Gum Arabic | 0.5-55% | 15-30% |
| Ascorbic Acid | 0-1% | 0.001-1% |
| Citric Acid | 0-3% | 0-3% |
| Gluconic Acid | 0-5% | 0-5% |
| Mid-Chain Triglycerides | 0-30% | 0-20% |
| Dammar Gum | 0-10% | 0.1-5% |
| Hop Oil | 0.1-30% | 5-20% |

In one example, only water, gum Arabic or *Acacia*, hop oil, and dammar gum may be used, with the amounts of each component within the preferred ranges shown in the table above. The amount of hop oil to be added in the oil mixture may be higher than other types of oils used for emulsification, such as THC, CBD, or hemp oil since hop oil is used to flavor a beverage or food product unlike other oils. For example, the amount of THC, CBD, or hemp oil to be added may be in the range of 1.5-5%. Additionally, less diluent oil is needed when hop oil is emulsified since hop oil itself is less viscous and has other plant oils, unlike cannabis.

Heat can be optionally applied (block 19) to the emulsifying solution and preservatives to assist in reduction of the viscosity of the emulsifying solution. Reducing the viscosity can lead to the use of less diluent oil in the oil mixture.

Once the oil mixture and the emulsifying solution are combined (block 15), the emulsifying agent surrounds the oil droplets of the oil mixture or the plant extract itself to stabilize the resulting emulsion. The combination is placed in a mixer, such as a high or low shear mixer, to undergo (block 16) shearing to reduce a particle size of the emulsified oil mixture or plant extract, if no diluent oil is used. The mixer can be a Silverson or IKA high shear mixer, however, other mixers are possible. At a minimum, the mixer should be able to produce a minimum of 3,000 rpms and above. Mixing should continue until oil droplets formed from the oil mixture or plant extract have a particle size less than 5 to 10 microns. In one embodiment, the oil droplets are less than 2 microns. However, other sizes are possible.

After removal from the mixer, the combination can be homogenized (block 17) mechanically using a high pressure mechanical homogenizer, such as by APV or GEA Niro, or sonically using a high energy ultrasonic device, such as the Biosonics Ultrasonic homogenizer, to further reduce a size of the oil droplets. Homogenization of the combination can enhance long term stability by reducing particle size, which reduces the rate at which the resulting emulsion will separate, thereby, enhancing shelf life stability. Performance of the manual homogenization can be optional based on a desired shelf stability of the liquid form of the plant component. For example, if only a short shelf life is required for a product, there may be no need to perform manual homogenization.

After homogenization of the combination, the oil droplets can be reduced to a size less than 1 micron. In one embodiment, the oil droplet size is less than 0.5 microns. Performing the emulsification and then homogenization enables large volumes of the oil-based plant extract to be processed in a reduced amount of time, in contrast to ultrasonic homogenization, which is inappropriate for large scale manufacture.

Further, a multiple step process allows for different sized particles after each step, which can be used in different types of consumer products. For example, coarser particles can be used as a clouding agent for beverages, while finer particles can be used in clear beverages.

The resulting liquid combination is stable, and thus non-separating, at room temperatures for periods of time up to six months or perhaps, longer. The smaller the emulsified particles and/or the more closely the densities of the emulsified oil droplets match the water phase, the more stable the emulsion becomes since the smaller size particles results in lower mass and thus, the gravitational forces driving separation of the plant extract are reduced. Further, the smaller the emulsified particle, the clearer the resulting emulsion becomes, which can be an important attribute, especially for food products, such as beverages.

When the emulsion is made for use in beer, the emulsion should be produced in the absence of oxygen, such as in a vacuum, in nitrogen, or in any inert atmosphere. Other environments with an absence of oxygen are possible. Removing oxygen is desired to prevent yeast from consuming sugar and undergoing aerobic respiration, during which carbohydrates are converted into carbon dioxide and water. In the absence of oxygen, fermentation can occur to convert sugar into carbon dioxide and alcohol.

The resulting emulsion can be combined with flavor, sugars, colorants, or other liquids, such as water and juice for sale as a beverage, or used as a cooking or baking ingredient for food, including in dry mixes, meal replacements, baked goods, and raw foods. Additionally, the emulsified liquid can be used in other non-food products, such as cosmetics, toiletries, and medical products, such as saline solution, cough syrup, sexual lubricants, and inhalers. The resulting liquid can also be used in many other products. For example, the resulting liquid can be utilized in frozen items, such as food, medicine or other goods, without separating due to the stability of the resulting liquid. Additionally, when used in food, the oil droplets are uniformly dispersed throughout the food so that one portion of a food item does not include high amounts of the plant extract, while other portions include very little.

Figure 2:
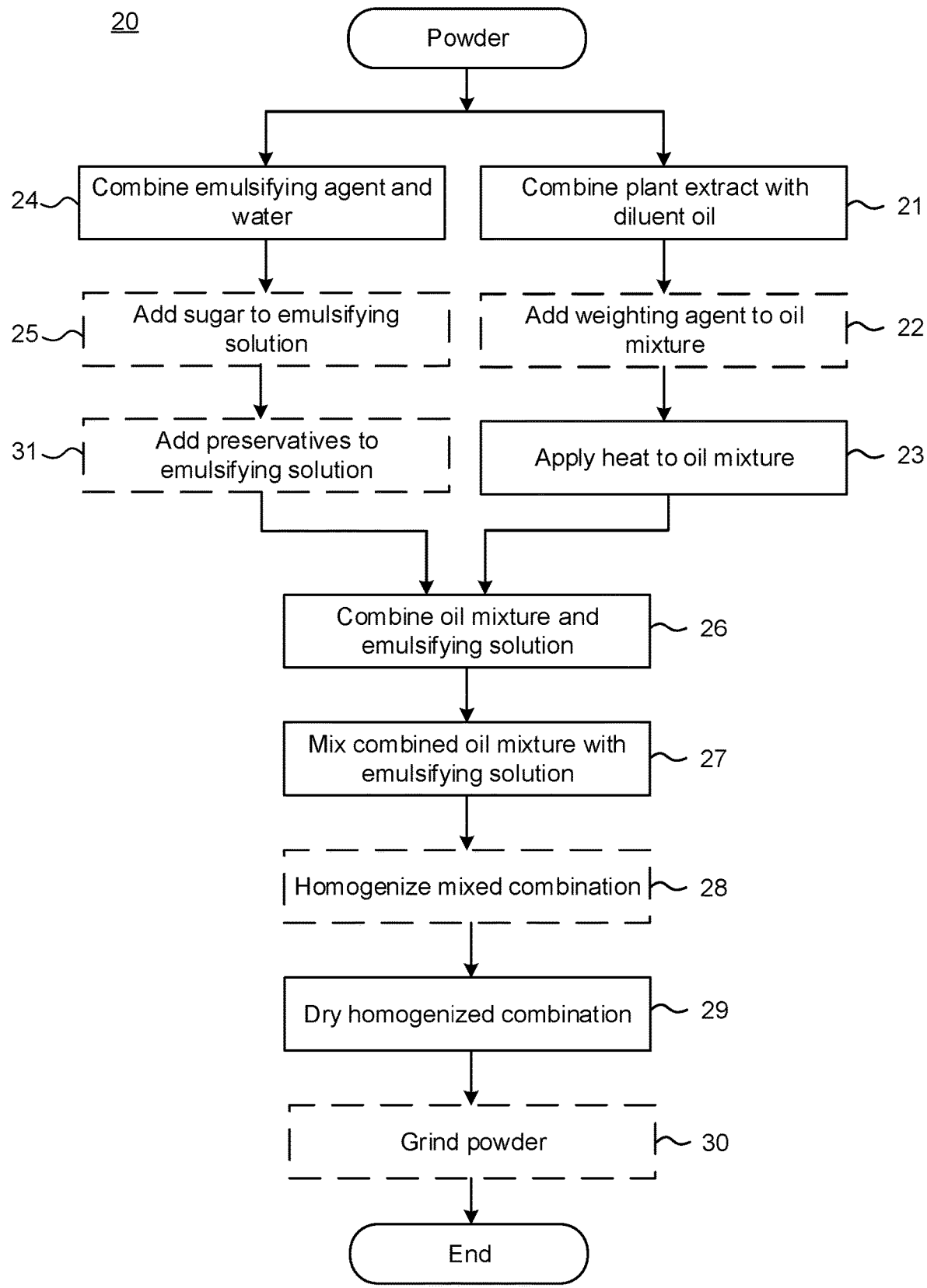
FIG. 2 is a flow diagram showing a method for preparing stable powder emulsion forms of plant extract, in accordance with one embodiment.

When added to beer, the hop oil can be added at any stage, such as at the malting, milling, mashing, lautering, wort boiling, wort clarification, fermentation, post fermentation, or storage stage. During studies, addition of the hop emulsion at the boiling stage removes the need for sterilization since the emulsion goes through boiling; however, some terpenes are also released. Addition of the hop emulsion at the fermentation stage can result in some biotransformation, which creates interesting flavor characteristics. Additionally, the hop emulsion is In addition to liquid form, the plant extract can also be converted to a powder form. FIG. 2 is a flow diagram showing a method for preparing stable powder emulsion forms of plant extract, in accordance with one embodiment. Plant extract can include uncleaned hops or processed hops as described above with respect to FIG. 1. The viscosity of the plant extract is lowered to around less than 35,000 cps by combining (block 21) the plant extract with a lower viscosity diluent oil, such as vegetable oil or other types of oils, to form an oil mixture. In one embodiment, the diluent oil is selected based on the plant extract to ensure the diluent oil has a lower viscosity than the plant extract. However, if the plant extract already has a lowered viscosity, no diluent oil is necessary and the plant extract can be combined with the weighting agent.

Optionally, a weighting agent, such as ester gum, brominated vegetable oil, sucrose acetate isobutyrate, or other weighting agents can be added (block 22) to the oil mixture or plant extract to balance or match the density of the oil mixture with that of the water phase. Subsequently, heat can be applied (block 23) to the oil mixture and weighting agent, if any, to enhance mixing of the plant extract and diluent oil.

Simultaneously or at a different time, an emulsifying agent, such as gum *Acacia*, modified food starch, Q-Naturale, lecithin, monoglycerides, diglycerides, tween 80, or tween 20 is dispersed (block 24) in water to create an emulsifying solution. Optionally, a sugar, such as a corn syrup solid or maltodextrin, or other food grade plating agent, such as starch, modified starch or a carbohydrate, including gum *Acacia*, can be added (block 25) as a carrier for the oil, to the emulsifying solution, to increase an efficiency of drying performed subsequent to an emulsification of the oil mixture and emulsifying solution, as further described below. In a further embodiment, preservatives can be added (block 31) to the emulsifying solution to increase the shelf life of the combination resulting from the emulsion.

Once the oil mixture is heated and a viscosity of the mixture is less than 35,000 cps, the oil mixture is combined (block 26) with the emulsifying agent for performing the emulsification. The combination of the oil mixture and emulsifying agent is placed in a high shear mixer for shearing (block 27), which occurs based on a high speed of rotation. In one embodiment, the mixing speed should be 1,000 rpms or greater. Mixing should until a size of the oil droplets of the plant extract, in the combination, can measure less than 50 microns.

Next, the combination can be optionally homogenized (block 28) mechanically or sonically, using homogenizers, as described above with respect to FIG. 1 to obtain smaller size emulsified particles. However, in one embodiment, if the particle sizes are less than 5 to 10 microns, no homogenization may be necessary. The droplets of the oil mixture or plant extract, in the combination, resulting after homogenization can measure below 1 micron. However, regardless of whether homogenization occurs, the resulting combination can be de-watered or dried (block 29) using a spray dryer, such as GEA Niro, Buchi, or APV, a drum drier, or on a sheet in an oven. Finally, the dried combination can be optionally ground (block 30) to a desired particle size. In one embodiment, the particle size can be selected based on the product into which the ground plant extract will be used.

In one example, a powered form of the plant extract can be packaged as a beverage mixer for putting in a water bottle to add the plant component. Other examples include use as a seasoning for placing in foods, for mixing in cosmetics, and to be compressed into a pill.

When hop extract, such as hop oil, is used, the hop oil can be converted to a different form can be combined with a weighting agent, and optionally, a diluent oil. The weighting agent can include ester gum, brominated vegetable oil, sucrose acetate isobutyrate, dammar gum or other types of weighting agents, and can increase the density of the hop oil to prevent the oil mixture from floating to the top when combined with water in a later step. Also, use of the optional weighting agent can help to evenly distribute the oil droplets to stabilize the converted liquid form of the hop extract.

In one embodiment, the amount of the weighting agent should be selected based on the desired target density of the resulting oil mixture or based on the hop oil. Specifically, the weighting agent should increase the density of the hop oil. Heat can be applied to the oil mixture to enhance mixing of the hop oil and weighting agent. Once the oil mixture reaches a particular predetermined viscosity level, such as less than around 35,000 cps, the mixture can be combined with an emulsifying solution, which can be prepared simultaneously with the heating of the oil mixture or at a different time. To prepare the emulsifying solution, an emulsifying agent, or emulsifier, is dispersed in water, which acts as a carrier to the hop oil when combined. The emulsifying agent can have low or high hydrophilic-lipophilic balance levels, and can include both water and oil soluble emulsifiers, such as modified food starch, an extract of the *Quillaja saponaria* Molina tree, known as Q-Naturale, lecithin, monoglycerides, gum *Acacia*, diglycerides, sucrose monopalmitate (P90), polysorbate 80 (tween 80), or polysorbate 20 (tween 20), as well as various proteins. Other emulsifying agents are possible.

Concentration of the emulsifying agent is first determined by its nature based on an emulsifying strength and then as a function of the oil mixture to be added. Different emulsifying agents can be used at a different ratio of emulsifier to oil mixture. For example, the emulsifying agents, Gum *Acacia* and modified food starch, can be used at a ratio of 1 part oil mixture to 0.1 to 4.0 parts emulsifying agent. Meanwhile, mono and/or diglycerides, Tween 20 or 80, and Q-Natural could be used at lower levels ranging from 1 part oil mixture to 0.1 to 1.0 emulsifying agent.

In one embodiment, preservatives can be added to the emulsifying solution to increase shelf life of the resulting emulsion. Examples of components that can be used as a preservative include, but are not limited to, one or more of potassium sorbate, sodium benzoate, ascorbic acid, gluconic acid, and citric acid. The preservatives can also be added at other steps, such as to the oil mixture or to the combined oil mixture and emulsifying solution.

In one embodiment, heat can be optionally applied to the emulsifying solution and preservatives to assist in reduction of the viscosity of the emulsifying solution. Once the oil mixture and the emulsifying solution are combined, the emulsifying agent surrounds the oil droplets of the oil mixture or the hop oil itself to stabilize the resulting emulsion. The combination is placed in a mixer, such as a high or low shear mixer, to undergo shearing to reduce a particle size of the emulsified oil mixture or hop oil, if no diluent oil is used. The mixer can be a Silverson or IKA high shear mixer, however, other mixers are possible. At a minimum, the mixer should be able to produce a minimum of 3,000 rpms and above. Mixing should continue until the oil droplets are at a preferred size. In one embodiment, the oil droplets are less than 2 microns.

After removal from the mixer, the combination can be optionally homogenized mechanically using a high-pressure mechanical homogenizer, such as by APV or GEA Niro, or sonically using a high energy ultrasonic device, such as the Biosonics Ultrasonic homogenizer, to further reduce a size of the oil droplets. Homogenization of the combination can enhance long term stability by reducing particle size, which reduces the rate at which the resulting emulsion will separate, thereby, enhancing shelf-life stability. Performance of the manual homogenization can be optional based on a desired shelf stability of the hop oil emulsion and product in which the hop oil emulsion is introduced. For example, if only a short shelf life is required for a product, there may be no need to perform manual homogenization.

After homogenization of the combination, the oil droplets can be optionally further reduced. A multiple step process allows for different sized particles after each step, which can be used in different types of consumer products. For example, coarser particles can be used as a clouding agent for beverages, such as the "haze" in beer, while finer particles can be used in clear beverages, such as water or sparkling water.

Specifically, water and beer have a different refractive index than the oil phase made up of the hop extract resulting in the cloud effect. As long as the particle size (particle being the enrobed oil phase) is greater than the wavelength of visible light (400 nm), the cloud effect may occur. However, any smaller and a cloud emulsion will begin to become translucent.

Further, additional components and substitutions of the components described above can include those provided in the table below. However, other components and substitutions are possible, including Sucrose Acetate Isobutyrate, Sodium Benzoate, Potassium Sorbate, Caprylic acid, Rosemary Extract, gum Arabic, xanthan gum, citrus terpenes, α Pinene, Linalool, Myrcene, Limonene, Terpinolene, Terpineol, Valencene, β Caryophyllene, Beta-caryophyllene oxide, Geraniol, Humulene, Carene, Terpinene, Borneol, alpha Bisabolol, Phytol, Camphene, Sabinene, Nerolidol, Guaiol, Isopulegol, Geranyl Acetate, Eucalyptol, and (+)-Cedrol. Still further components can be used, including different emollients, humectants, thickening agents, preservatives, permeation enhancers, chelating agents, antioxidants, buffering agents and solvents.

Once generated, the emulsion can be packaged for addition to a barrel of beer to create the haze prior to sale or to a different type of beverage. Additionally, the emulsion can be added to water, sparkling water, tea, soda, juice, or other types of beverages. In one example, the hop emulsion can be added to sparkling water to produce a non-alcoholic beer.

Once packaged, changes in chemical composition can occur as a result of small molecule movement between the packaging and the solid or liquid product in the packaging. Different types of composition changes can include food scalping, which refers to loss of quality of a product due to flavors being absorbed by the packaging, and aroma scalping, which refers to the movement of aromas from food to a package, such as in citrus juices.

Movement of small molecules from package to food may also occur, and this may result in off aromas or unwanted compounds being present in a food. An example includes cork taint in which an off aroma of wine results from particular aroma molecules that move from cork to wine. A further example includes the binding of aroma molecules by a food package, such as the scalping of limonene by plastic packaging.

For beer and other carbonated products, aluminum cans are a convenient, light-weight, highly recyclable, and robust package for beverages and provide better light protection than glass and better oxygen and gas protection than plastics. Metal cans require a lining to protect against food contact, especially with low-pH foods in aluminum cans. Low-pH solutions will corrode and dissolve aluminum, requiring a barrier layer. The main types of polymers used as can linings include epoxy, vinyl, acrylic, polyester and oleoresin. Can linings must adhere well to walls, be stable during processing, resist corrosion, be flexible and not brittle, not degrade in the presence of acidic foods/beverages, and ideally be applicable to all food types. A popular can lining has been the epoxy lining.

Outcomes from at least one prior study of hop oil and absorption of hop volatiles have shown that short exposure time to the packaging material already yielded a high migration of certain compounds, which alters the original balance of the flavor compounds and, thus, results in flavor losses and flavor deterioration. Left unprotected the flavor compounds and terpenes in the hop oil would and do undergo scalping. The hop oil emulsion affords a level of protection to scalping by creating a micelle that helps mitigate the ability of the compounds to interact directly with the liner.

Another benefit of using hop emulsion is that the flavor of a beverage with hop oil added directly often varies due to crop variation of the hops used for the oil. The emulsion prevents this variation. Further, hops are commonly grown in the spring after the last frost has occurred and beverages using a particular hop may not be able to be produced all year due to the growing season of the hops. However, hop oil emulsion can be prepared and stored so that the beverage in which the hop emulsion is added, can be made all year.

While the invention has been particularly shown and described as referenced to the embodiments thereof, those skilled in the art will understand that the foregoing and other changes in form and detail may be made therein without departing from the spirit and scope of the invention.

What is claimed is:

1. A method for preparing hop extract emulsions, comprising the steps of:
    combining 1-2 parts hop extract comprising lupulin powder with 8-9 parts diluent oil as an oil mixture;
    heating the oil mixture;
    upon heating the oil mixture to a viscosity threshold, combining the oil mixture with an emulsifying solution comprising an emulsifying agent dispersed in water;
    mixing the combined oil mixture and emulsifying solution in an absence of oxygen, wherein the emulsifying agent enrobes droplets of the lupulin power and diluent oil;
    homogenizing the combined oil mixture and emulsifying solution as a hop extract emulsion.

2. A method according to claim 1, wherein the hop extract is extracted from uncleaned or processed hops.

3. A method according to claim 2, wherein the processed hops are processed via one of steam distillation, $CO_2$ extraction, fractional distillation, and microwave assisted extraction.

4. A method according to claim 1, wherein the hop extract comprises one or more of hop oil, terpenes, and hydrocarbons with the lupulin powder.

5. A method according to claim 1, further comprising:
    grinding the hop extract prior to mixing with the diluent oil.

6. A method according to claim 1, wherein the hop extract emulsion is added to a beverage.

7. A method according to claim 1, wherein the emulsifying agent enrobed droplets each comprise a size between 2 and 45µ to create a hazy appearance of the beverage.

8. A method according to claim 6, wherein the hop extract emulsion is added at a stage during processing of the beverage comprising malting, milling, mashing, lautering, wort boiling, wort clarification, fermentation, post fermentation, or storage.

9. A method according to claim 1, wherein the mixing of the combined oil mixture and emulsifying solution in the absence of oxygen is performed in a vacuum, in nitrogen, or in an inert atmosphere.

10. A method according to claim 1, further comprising:
    adding a preservative to the hop extract emulsion, wherein the preservative comprises one or more of potassium sorbate, sodium benzoate, ascorbic acid, gluconic acid, and citric acid.

* * * * *